United States Patent
Scott

(10) Patent No.: US 6,609,378 B2
(45) Date of Patent: Aug. 26, 2003

(54) ENERGY BASED FUEL CONTROL SYSTEM FOR GAS TURBINE ENGINES RUNNING ON MULTIPLE FUEL TYPES

(75) Inventor: Michael W. Scott, Boston, MA (US)

(73) Assignee: Honeywell International Inc., Morristown, NJ (US)

(*) Notice: Subject to any disclaimer, the term of this patent is extended or adjusted under 35 U.S.C. 154(b) by 71 days.

(21) Appl. No.: 10/053,114

(22) Filed: Jan. 17, 2002

(65) Prior Publication Data

US 2003/0131604 A1 Jul. 17, 2003

(51) Int. Cl.[7] .............................................. F02G 9/00
(52) U.S. Cl. ..................... 60/773; 60/39.463; 60/39.281
(58) Field of Search .............................. 60/773, 39.463, 60/742, 39.281

(56) References Cited

U.S. PATENT DOCUMENTS

| | | | |
|---|---|---|---|
| 3,875,380 A | | 4/1975 | Rankin |
| 4,470,118 A | * | 9/1984 | Morrison .................... 701/100 |
| 4,472,936 A | | 9/1984 | Uchiyama et al. |
| 4,486,148 A | | 12/1984 | Battah |
| 4,761,948 A | | 8/1988 | Sood et al. |
| 4,833,878 A | | 5/1989 | Sood et al. |
| 4,971,136 A | | 11/1990 | Mathur et al. |
| 4,993,221 A | * | 2/1991 | Idelchik ........................ 60/773 |
| 4,995,232 A | * | 2/1991 | Sutton .......................... 60/243 |
| 5,083,277 A | * | 1/1992 | Shutler ......................... 701/100 |
| 5,274,996 A | * | 1/1994 | Goff et al. ..................... 60/790 |
| 5,694,760 A | * | 12/1997 | Baxter .......................... 60/773 |
| 5,732,546 A | * | 3/1998 | Pineo et al. ................... 60/773 |
| 5,761,895 A | * | 6/1998 | Chu et al. ..................... 60/773 |
| 5,934,065 A | | 8/1999 | Bronicki et al. |
| 6,082,092 A | | 7/2000 | Vandervort |
| 6,226,976 B1 | | 5/2001 | Scott et al. |
| 6,539,722 B2 | * | 4/2003 | Nagata et al. ................ 60/773 |

* cited by examiner

Primary Examiner—Charles G. Freay
Assistant Examiner—William H. Rodriguez
(74) Attorney, Agent, or Firm—Robert Desmond, Esq.

(57) ABSTRACT

A system and method is provided that employs schedules and gains in an electronic control unit for a gas turbine engine which are independent of fuel type used to run the engine. According to one embodiment, the method comprises the steps of determining engine requirements and calculating a desired energy flow for at least one engine, maintaining desired engine conditions according to the desired energy flow; converting the desired energy flow into expected fuel flow according to the specific fuel being utilized, calculating a fuel flow command, and communicating the fuel flow command to at least one fuel valve.

24 Claims, 3 Drawing Sheets

ENERGY BASED FUEL CONTROL SYSTEM FOR GAS TURBINE ENGINES RUNNING ON MULTIPLE FUEL TYPES

BACKGROUND OF THE INVENTION

The present invention generally relates to gas turbine engine control, and in particular to fuel control systems and methods for gas turbine engines.

Gas turbine engines run on a number of different types of fuel gases including natural gas, LPG's such as propane and butane, refinery gases, and coal-derived gases. Many engines are set up as dual fuel applications with a primary fuel source and a backup fuel source. Gas turbine engines, whether used on the ground for power generation, in flight for propulsion, or as a secondary power source, are typically controlled by an electronic control unit (hereinafter ECU). Control schedules and control logic for the engine are incorporated within the ECU. Electronic engine controls are designed based on the fuel type for that particular application. Because engines run on many different types of fuels, control schedules and logic have to be calculated for each fuel. Known within the art is the use of ECU's to determine the appropriate fuel flow to the particular engine. However, this is generally cumbersome, not easily amenable to a multitude of different types of fuel, and requires customization for each type.

U.S. Pat. No. 3,875,380 issued to Rankin discloses an Industrial Gas Turbine Power Plant Control System and Method Implementing Improved Dual Fuel Scheduling Algorithm Permitting Automatic Fuel Transfer Under Load. The '380 patent allows for computer control of fuel subsystems to achieve uninterrupted operation during transitions from operation on one fuel to operation on another or to operation on a mixture of the two fuels. This provides a system capable of operating with more than one fuel type. However, such systems generally require customization for each fuel type, and only allow for two fuel types.

U.S. Pat. No. 6,226,976 issued to Scott discloses a Variable Fuel Heating Value Adaptive Control For Gas Turbine Engines. The '976 patent allows for a control and method that continuously adjust fuel sensitive schedules in the ECU for changes in the heating value of the fuel being combusted by the engine. This is accomplished by calculating an expected fuel flow for a baseline fuel type and an actual fuel flow. A ratio of these two fuel flows is determined and applied to the heating value of a baseline fuel type that is preprogrammed into the ECU. This results in a scale factor that is then applied to fuel sensitive schedules in the ECU. While the '976 patent represents a significant advancement within the art, it applies specifically to a particular engine type, affects only part of the engine control logic, and is applicable to one engine subject to varying fuel types while running.

Accordingly, there is a need for a system and method that applies generally to all engine types, affects the entire fuel control system, and is applicable when several of the same engine models are used in applications with differing fuel types. There is also a need for a system and method that allows for control of fuel subsystems that run on a multitude of different fuel types and do not require customization for each fuel type.

SUMMARY OF THE INVENTION

In one aspect of the present invention, a method for adjusting the gains and schedules in an electronic control unit for a gas turbine engine comprises the steps of determining engine requirements and calculating a desired energy flow for at least one engine; maintaining desired engine conditions according to the desired energy flow; converting the desired energy flow into expected fuel flow according to the specific fuel being utilized; calculating a fuel flow command; and communicating the fuel flow command to at least one fuel valve.

In another aspect of the present invention, a method for adjusting the gains and schedules in an electronic control unit for a gas turbine engine comprises the steps of determining engine requirements for at least one engine and calculating the desired energy flow for each engine to be delivered to a gas turbine engine; maintaining desired engine conditions according to the desired energy flow; converting the desired energy flow into expected fuel flow according to the specific fuel being utilized, wherein at least two fuel types are being utilized; calculating a fuel flow command for the fuel types; determining a ratio according to the respective fuel types; applying the ratio to the fuel flow to determine a fuel flow command; and communicating the fuel flow commands to at least one fuel valve.

In a still further aspect of the present invention, a gas turbine engine comprises a compressor receiving ambient air, a combustor receiving compressed air from the compressor and fuel from a fuel nozzle, a turbine receiving combusted gas from the combustor and expelling the gas into an exhaust; a shaft coupling the compressor and the turbine, at least one fuel control unit, an electronic control unit electronically coupled to the engine and the fuel control unit, with the electronic control unit having at least one energy sensitive control schedule, and the electronic control unit determining a desired energy flow, maintaining desired engine conditions according to the energy flow, and converting the energy flow into at least one fuel flow command that executes a command to a fuel valve.

These and other features, aspects and advantages of the present invention will become better understood with reference to the following drawings, description and claims.

DETAILED DESCRIPTION OF THE INVENTION

Figure 1:
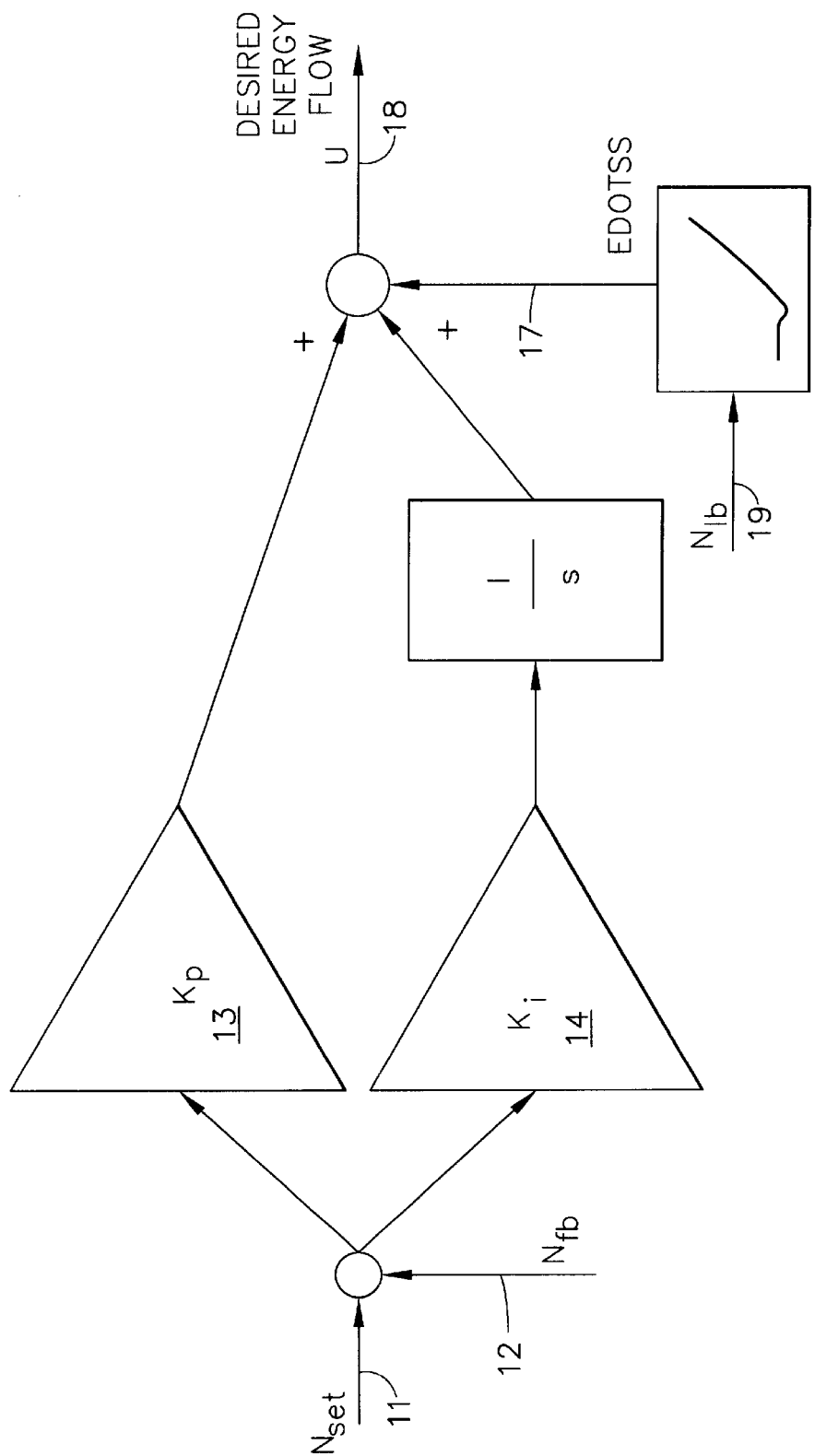
FIG. 1 is a block diagram of a method contemplated by the present invention to determine the desired energy flow to be delivered to a gas turbine engine.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method and system for adjusting schedules and gains in an electronic control unit for a gas turbine engine for a multitude of different engine types and fuel types without the need for customization. Whereas previously fuel specific properties where utilized to adjust schedules, the present invention utilizes values based on energy flow to adjust schedules, then converts these energy flow based values to fuel flows and delivers fuel commands accordingly.

In one embodiment, the ECU includes a microprocessor programmed to perform the following functions. These functions can be programmed by anyone skilled in the programming art and may be implemented by digital circuitry. It should be understood by those skilled in the art that the ECU contains and implements the following schedules or logic and delivers commands according these schedules or logic. For instance, the electronic control unit may implement a schedule, according to energy flows for a particular engine, to deliver a given amount of a particular fuel to a fuel valve.

The present invention provides a control and method programmed into the ECU. The control and method includes the steps of determining engine requirements for at least one engine. It should be understood, however, that the present invention applies to all engine types and is applicable when several engine models are used in applications with differing fuel types. The engine requirements or conditions may be, for example, the desired engine acceleration. Then a desired energy flow is calculated for the particular engine, and the desired engine conditions are maintained according to this desired engine condition. This may be accomplished by utilizing a predetermined equation, such as a classic Proportional-integral (PI) Controller of an acceleration ($N_{dot}$) controller. By way of example, the control schedule may add or subtract energy flow to the engine to maintain desired energy acceleration. The desired energy flow is next converted into expected fuel flow according to the specific fuel being utilized. This may be accomplished by dividing the desired energy flow by the heating value of particular fuel, which results in an expected fuel flow. From this expected fuel flow a command may be given to an electronic control unit, which in turn supplies fuel according said command to a fuel valve.

It may also be desirable to maintain the desired energy flow limit within maximum and minimum ranges. Because the present invention utilizes energy flow limits, rather than fuel-based unit the calculations are engine specific and need only be done once. This eliminates specialization for each fuel type. Rather, the desired energy flow limit is held within the maximum and minimum energy flows.

The present invention is particularly well suited for use with dual and multiple fuel engines. The control and method includes the steps of determining engine requirements for at least one engine, a desired energy flow is calculated for the particular engine, and the desired engine conditions are maintained according to this desired engine condition. It should be noted that the desired energy flow is for the engine as a whole, and for each fuel type's required energy flow, their sum will be equal to 1. By way of example, a dual fuel engine with natural and liquid gas, wherein 60% of the energy commanded will be achieved with natural gas and 40% will be achieved through liquid fuel. The total energy commanded should always equal 100% and, therefore, a number of different fuel types may be employed in this manner, not only dual fuel engines. Desired energy flow is then converted into expected fuel flow according to the specific fuels being utilized. This may be accomplished by dividing the desired energy flow by the heating value of each particular fuel, which results in an expected fuel flow for the respective fuel types. A schedule, command or request is calculated and given to an electronic control unit, which in turn supplies fuel according this command to a fuel valve.

The present invention envisions a system for employing the present invention that may include a compressor receiving ambient air, a combustor receiving compressed air from the compressor and fuel from a fuel nozzle, a turbine receiving combusted gas from the combustor and expelling the gas into an exhaust, a shaft coupling the compressor and turbine, at least one fuel control unit for delivering metered fuel flow to the fuel nozzle, and an electronic control unit. The electronic control unit will have at least one energy sensitive control schedule. Previously electronic control units contained fuel sensitive control schedules. Also, the electronic control unit may contain schedules that maintain the desired energy flow between maximum and minimum energy flows, converting energy flows to fuel flows for a particular fuel and send a fuel flow command to the fuel valve.

Referring to FIG. 1, shown is one embodiment of the present invention utilizing a classic Proportional-integral (PI) controller. It is should be understood by those skilled within the art that a number of different algorithms, schedules or logic, may serve similar purposes. By way of example, an acceleration ($N_{dot}$) controller would also work.

The block diagram shown in FIG. 1 represents a desired energy flow schedule or control logic for the desired energy flow U 18, according to the following equation:

$$U=K_p(N_{set}-N_{fb})+K_i/s(N_{set}-N_{fb})+EDOTSS$$

wherein Nset 11 is an engine setpoint, $N_{fb}$ 12 is an engine speed feedback, $K_p$ represents a proportional gain 13, $K_i$ is an integral gain 14, and EDOTSS 17 is a steady state energy flow. The engine setpoint, $N_{set}$ 11, is the speed at which the controller is set to control the system. $N_{fb}$ 12 is an actual measured engine speed feedback. By performing the above calculation, U 18 is calculated in units of BTU/sec. Previously in the art, fuel flow (by way of example in units of lb/sec) was the output of a classic Proportional-integral (PI) controller. The present invention though, according to one embodiment, calculates the desired energy flow, which is based on thermodynamic properties. Accordingly, because the proportional gains, integral gains, integrator limits and required to run schedules are based on engine thermodynamic requirements, not fuel properties, they are fixed for a given engine and do not need to be recomputed for different fuel types. The value derived represents the desired energy flow U 18.

Figure 2:
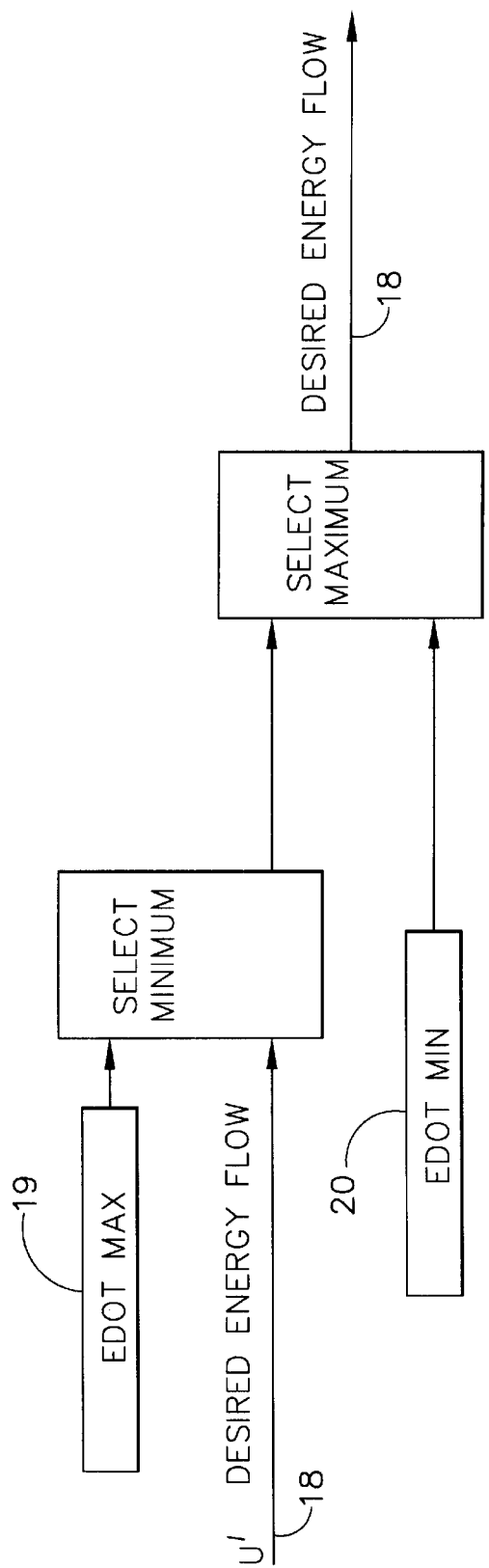
FIG. 2 is a block diagram of a method contemplated by the present invention to maintain the desired energy flow for a particular fuel within maximum energy flow limits and minimum energy flow limits.

It may also be desirable to maintain the desired energy flow limit within maximum and minimum ranges. Because the present invention utilizes energy flow limits, rather than fuel-based unit the calculations are engine specific and need only be done once. This eliminates specialization for each fuel type. Rather, the desired energy flow limit is held within the maximum and minimum energy flows. According to one embodiment, the desired energy flow U 18 can be inputted to the Maximum and Minimum Energy Flow schedule or control logic represented by FIG. 2. The desired energy flow 18 may be held within the limit represented by EDOT Max 19, which represents the maximum energy flow limit. The maximum energy flow limit is the greatest energy flow limit (BTU/sec) allowed for a given engine at a certain operating condition. EDOT Min 20, which represents the minimum energy flow limit. The minimum energy flow limit is the least energy flow limit (BTU/sec) allowed for a given engine at a certain operating condition. If the desired flow energy U 18 is greater than the maximum energy flow limit EDOT MAX 19, the desired flow limit U 18 can be set to equal the maximum energy flow limit EDOT MAX 19. If the desired flow energy U 18 is less than the minimum energy flow EDOT Min 20, the desired flow energy U 18 can be set to equal the minimum energy flow EDOT Min 20. The output is a desired flow energy U 18 that is a number greater than the minimum energy flow EDOT Min 19 and less than the maximum energy flow EDOT Max 19. As discussed previously, because the output is based on energy flow rather than fuel flow, schedules are based on engine thermodynamic requirements, not fuel properties. Therefore, the schedules are fixed for a given engine and do not need to be recomputed for different fuel types. This allows for a control system that is capable of running on a number of different fuel types and is easily implemented within a multitude of different engine types.

The present invention is particularly well suited for use with dual and multiple fuel engines. The control and method includes the steps of determining engine requirements for at least one engine, a desired energy flow is calculated for the particular engine is calculated, and the desired engine conditions are maintained according to this desired engine condition. It should be noted that the desired energy flow is for the engine as a whole, and for each fuel types required energy flow, their sum will be equal to 1. By way of example, a dual fuel engine with natural and liquid gas, wherein 60% of the energy commanded will be achieved with natural gas and 40% will be achieved through liquid fuel. The total energy commanded should always equal 100% and, therefore, a number of different fuel types may be employed in this manner, not only dual fuel engines. Desired energy flow is then converted into expected fuel flow according to the specific fuels being utilized. This may be accomplished by dividing the desired energy flow by the heating value of each particular fuel, which results in an expected fuel flow for the respective fuel types. A schedule, command or request is calculated and given to an electronic control unit, which in turn supplies fuel according this command to a fuel valve.

Figure 3:
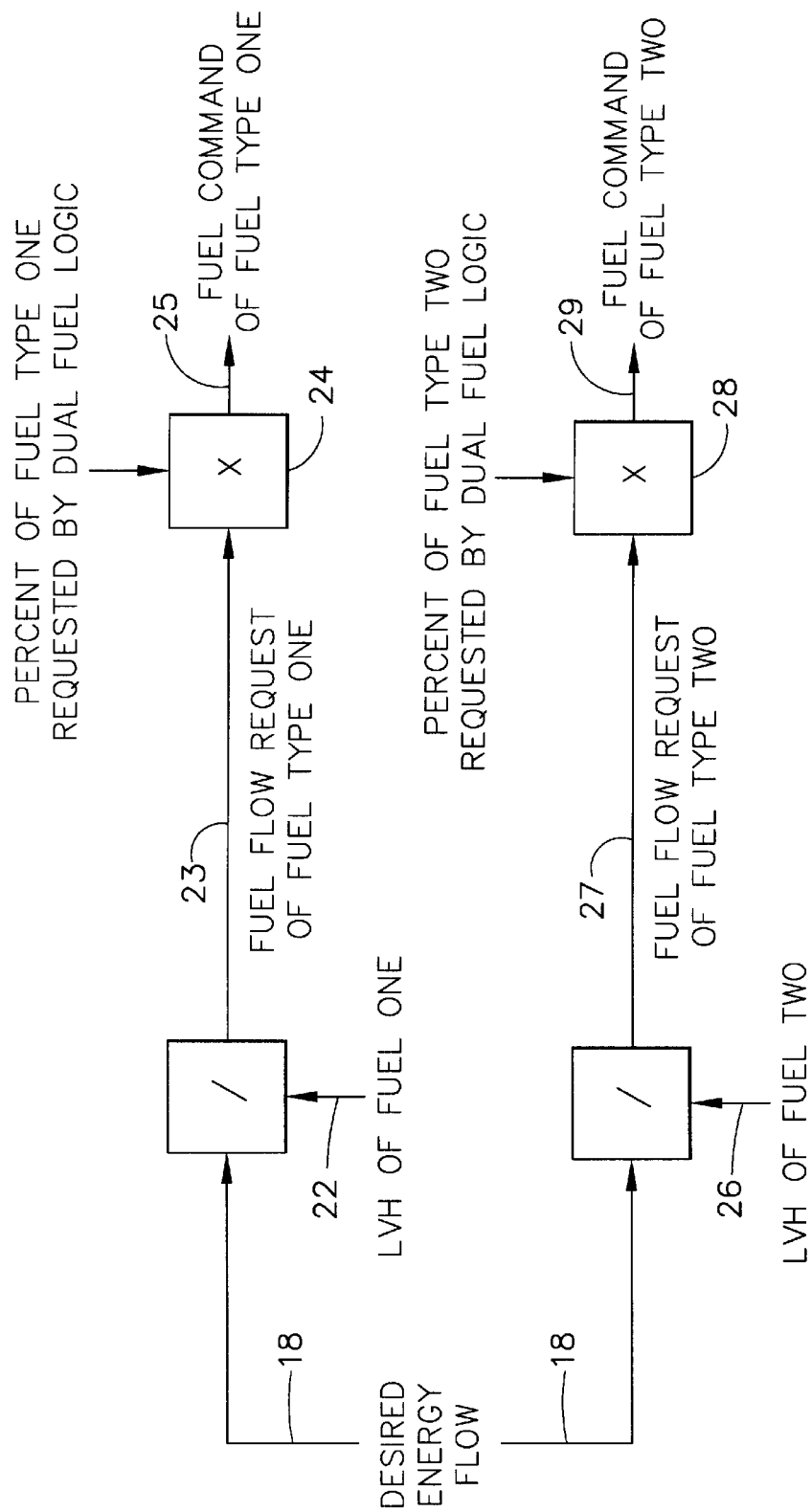
FIG. 3 is a block diagram of a method contemplated by the present invention to convert desired energy flow into expected fuel flow according to the fuel utilized.

FIG. 3 depicts the Conversion Schedule or Control logic, wherein the desired energy flow U 18 can be converted into fuel flows. This embodiment depicts a dual fuel application. Because the desired energy flow U 18 is converted into fuel flows, the logic shown is dependant on fuel specific properties. The term lower heating value (LHV) is well known within the art and utilized as a standard in the gas turbine industry. For each fuel, a LHV is assumed. For instance, according to an embodiment, the fuel type may be natural gas with a LHV of 20,100 BTU/lb. It should be appreciated that other fuels may be chosen such as Jet A, JP1, JP2, JP3, JP4 or other fuels commonly used in gas turbine engines. In order to convert the desired energy flow to fuel flow, the desired energy flow U 18 is divided by the lower heating value of the fuel which results in a fuel flow with units of (lb/sec). As shown in FIG. 3, the desired energy flow U 18 may be divided by the LVH of a first fuel 22 to arrive at a fuel flow request 23 for the first type fuel, then the percent of first fuel required 24 is calculated. The percent of first fuel required is the percentage of the first fuel that comprises the energy flow. The fuel flow request 23 for a first fuel type and fuel command 25 for first fuel type is executed to the engine controller, which in turn delivers the command to the fuel valve. The desired energy flow U 18 may be divided by the LVH of a second fuel 26 to arrive at a fuel flow request 27 for the second fuel, then the percent of the second fuel required 28 is calculated. The percent of second fuel required is the percentage of the second fuel that comprises the energy flow. The fuel command 29 for the second fuel type is executed to the engine controller, which in turn delivers the command to the fuel valve. It should be understood that this is representative of a dual fuel engine, but it is a purpose of the present invention to be capable of determining fuel flow requests and commands for a multitude of different fuel types.

The foregoing method may be constantly run so long as the engine is running. Thus, a method and system is provided that constantly adjusts energy and fuel flow sensitive schedules in the ECU for changes in the heating value of the fuel being combusted by the engine.

It should be understood, of course, that the foregoing relates to preferred embodiments of the invention and that modifications may be made without departing from the spirit and scope of the invention as set forth in the following claims.

I claim:

1. A method for adjusting gains and schedules in an electronic control unit for a gas turbine engine comprising the steps of:

determining engine requirements and calculating a desired energy flow for at least one engine;

maintaining desired engine conditions according to said desired energy flow;

converting said desired energy flow into expected fuel flow according to a fuel being utilized;

calculating a fuel flow command; and communicating said fuel flow command to at least one fuel valve.

2. The method of claim 1, wherein said step of calculating a desired energy flow includes the step of solving a predetermined equation.

3. The method of claim 2, wherein said predetermined equation is $$U = Kp*(Nset-Nfb) + Ki/s(Net-Nfb) + EDOTSS:$$

wherein U=desired energy flow

Kp=a proportional gain

Nset=engine setpoint

Nfb=engine speed feedback

Ki=integral gain

Nfb=engine speed feedback

EDOTSS=steady state energy flow.

4. The method of claim 1, further comprising the step of determining a maximum energy flow limit and inputting said maximum energy flow limit as said desired energy flow where said desired energy flow exceeds said maximum energy flow limit.

5. The method of claim 1, further comprising the step of determining a minimum energy flow limit and inputting said minimum energy flow limit as said desired energy flow where said minimum energy flow limit exceeds said desired energy flow.

6. The method of claim 1, wherein said desired engine conditions are maintained by adding energy flow to said engine.

7. The method of claim 1, wherein said desired engine conditions are maintained by subtracting said energy flow to said engine.

8. The method of claim 1, wherein said desired engine conditions are chosen from the group consisting of engine speed, temperature, load, and combinations thereof.

9. The method of claim 1, further comprising the step of calculating a heating value.

10. The method of claim 9, wherein said heating value is a lower heating value.

11. A method for adjusting gains and schedules in an electronic control unit for a gas turbine engine comprising the steps of:
   determining engine requirements for at least one engine and calculating a desired energy flow for said at least one engine to be delivered to a gas turbine engine;
   maintaining desired engine conditions according to said desired energy flow;
   converting said desired energy flow into expected fuel flow according to fuels being utilized, wherein at least two fuel types are being utilized;
   calculating a fuel flow command for said fuel types;
   determining a ratio according to the respective fuel types;
   applying said ratio to said fuel flow to determine a fuel flow command; and
   communicating said fuel flow commands to at least one fuel valve.

12. The method of claim 11, further comprising the step of utilizing a governor to calculate a desired energy flow which includes the step of solving a predetermined equation.

13. The method of claim 12, wherein said predetermined equation is $$U = Kp*(Nset-Nfb) + Ki/s(Net-Nfb) + EDOTSS:$$

wherein U=desired energy flow
   Kp=a proportional gain
   Nset=engine setpoint
   Nfb=engine speed feedback
   Ki=integral gain
   Nfb=engine speed feedback
   EDOTSS=steady state energy flow.

14. The method of claim 11, further comprising the step of determining a maximum energy flow limit and inputting said maximum energy flow limit as said desired energy flow where said desired energy flow exceeds said maximum energy flow limit.

15. The method of claim 11, further comprising the step of determining a minimum energy flow limit and inputting said minimum energy flow limit as said desired energy flow where said minimum energy flow limit exceeds said desired energy flow.

16. The method of claim 11, wherein said desired engine conditions are maintained by adding energy flow to said engine.

17. The method of claim 11, wherein said desired engine conditions are maintained by subtracting said energy flow to said engine.

18. The method of claim 11, wherein said desired engine conditions are chosen from the group consisting of engine speed, temperature, load, and combinations thereof.

19. The method of claim 11, further comprising the step of calculating a heating value.

20. The method of claim 11, wherein said heating value is a lower heating value.

21. A method for adjusting gains and schedules in an electronic control unit for a gas turbine engine comprising the steps of:
   determining engine requirements and calculating a desired energy flow for at least one engine, using the following predetermined equation:

$$U = Kp*(Nset-Nfb) + Ki/s(Net-Nfb) + EDOTSS$$

wherein U=desired energy flow
   Kp=a proportional gain
   Nset=engine setpoint
   Nfb=engine speed feedback
   Ki=integral gain
   Nfb=engine speed feedback
   EDOTSS=steady state energy flow
   maintaining desired engine conditions according to said desired energy flow, wherein a maximum energy flow and minimum energy flow limit are calculated, and when said minimum energy flow limit exceeds said desired energy flow said minimum energy flow limit is inputted as said desired energy flow, and when desired energy flow exceeds said maximum energy flow limit said maximum energy flow limit is inputted as said desired energy flow;
   converting said desired energy flow into expected fuel flow by dividing said desired energy flow by the lower heating value of the specific fuel being utilized;
   calculating a fuel flow command by multiplying said expected fuel flow by the percentage of each fuel that comprises the energy flow, resulting in a fuel flow command; and
   communicating said fuel flow command to at least one fuel valve.

22. A gas turbine engine comprising;
   a compressor receiving ambient air;
   a combustor receiving compressed air from said compressor and fuel from a fuel nozzle;
   a turbine receiving combusted gas from said combustor and expelling said combusted gas into an exhaust;
   a shaft coupling said compressor and said turbine;
   at least one fuel control unit;
   an electronic control unit electronically coupled to said engine and said fuel control unit, said electronic control unit having at least one energy sensitive control schedule; and
   said electronic control unit determining a desired energy flow, maintaining desired engine conditions according to said energy flow, and converting said energy flow into at least one fuel flow command that executes a fuel command to a fuel valve.

23. A system as in claim 22, wherein said electronic control unit maintains desired engine conditions according within a maximum energy flow limit and a minimum energy flow limit.

24. A system as in claim 22, wherein said electronic control unit calculates two fuel commands for a first fuel and a second fuel.

* * * * *